United States Patent
Oda

(10) Patent No.: US 8,914,231 B2
(45) Date of Patent: Dec. 16, 2014

(54) MOBILE-SIDE TERMINAL APPARATUS, POSITION TRANSMISSION METHOD AND COMPUTER PROGRAM

(75) Inventor: Toshiaki Oda, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

(21) Appl. No.: 13/695,987

(22) PCT Filed: May 6, 2011

(86) PCT No.: PCT/JP2011/060588
§ 371 (c)(1),
(2), (4) Date: Nov. 2, 2012

(87) PCT Pub. No.: WO2011/138962
PCT Pub. Date: Nov. 10, 2011

(65) Prior Publication Data
US 2013/0046460 A1    Feb. 21, 2013

(30) Foreign Application Priority Data

May 7, 2010    (JP) .................................. 2010-107465

(51) Int. Cl.
*G01S 1/00* (2006.01)
*G08G 1/00* (2006.01)
*G01C 21/20* (2006.01)

(52) U.S. Cl.
CPC *G01C 21/20* (2013.01); *G08G 1/20* (2013.01); *H04M 2250/10* (2013.01)
USPC ........................................................ 701/424

(58) Field of Classification Search
USPC ................................................. 701/517, 424
See application file for complete search history.

(56) References Cited

U.S. PATENT DOCUMENTS

| | | | |
|---|---|---|---|
| 6,510,381 B2 * | 1/2003 | Grounds et al. | 701/517 |
| 7,788,029 B2 * | 8/2010 | Nagase et al. | 701/422 |
| 2005/0075116 A1 | 4/2005 | Laird et al. | |
| 2007/0149208 A1 | 6/2007 | Syrbe et al. | |
| 2011/0054770 A1 * | 3/2011 | Allen et al. | 701/200 |

FOREIGN PATENT DOCUMENTS

| | | |
|---|---|---|
| EP | 2051491 A2 | 4/2009 |
| JP | 2003-18645 A | 1/2003 |
| JP | 2005-147946 A | 6/2005 |
| JP | 2006-65391 A | 3/2006 |
| JP | 2006-185436 A | 7/2006 |

OTHER PUBLICATIONS

Communication dated Sep. 30, 2014, issued by the European Patent Office in corresponding European Application No. 11777481.0.

* cited by examiner

*Primary Examiner* — James Trammell
*Assistant Examiner* — Michael D Lang
(74) *Attorney, Agent, or Firm* — Sughrue Mion, PLLC

(57) ABSTRACT

A mobile-side terminal apparatus of the present invention includes: a route information storing unit that stores route information related to a route that a user follows; a position acquiring unit that acquires a present position of the user; a display unit that displays the route information stored in the route information storing unit and the present position acquired by the position acquiring unit; and a position transmitting unit that performs transmission of the present position acquired by the position acquiring unit to another information processing device that stores the route information and displays the route information and the present position.

11 Claims, 13 Drawing Sheets

FIG. 9

| MOBILE PERSON IDENTIFICATION INFORMATION | PRESENT POSITION |
|---|---|
| AAA@bbb.jp | X1, Y1, Z1 |
| BBB@ccc.jp | X2, Y2, Z2 |
| ⋮ | ⋮ |

MOBILE-SIDE TERMINAL APPARATUS, POSITION TRANSMISSION METHOD AND COMPUTER PROGRAM

CROSS REFERENCE TO RELATED APPLICATIONS

This application is a National Stage of International Application No. PCT/JP2011/060588, filed on May 6, 2011, which claims priority from Japanese Patent Application No. 2010-107465, filed on May 7, 2010, the contents of all of which are incorporated herein by reference in their entirety.

TECHNICAL FIELD

The present invention relates to technology for providing positional information to a user.

BACKGROUND ART

It is not by any means rare for a mountaineer to take the wrong route and go missing, and in recent years has happened many times. Also, accidents due to getting lost are not limited to mountaineering, and occur in various outdoor locations such as at sea and in the forest. Technology has been proposed so as to solve these kinds of problems with mobile phones having a GPS function (refer to Patent Document 1). In such technology, first, positional information and map data for a destination are imported from a car navigation system into a mobile phone. Then, navigation can be continuously performed with information from the mobile phone for a person who intends to move on foot from the position where he/she has alighted from the vehicle to the destination.

PRIOR ART DOCUMENT

Patent Document

[Patent Document 1] Japanese Unexamined Patent Application, First Publication No. 2005-147946

SUMMARY OF THE INVENTION

Problem to be Solved by the Invention

However, even if performing navigation for a person moving about in the outdoors is realized, there is no means for another person to know what route the person moving about in the outdoors has followed. For that reason, in the event of that person getting lost, there has been the problem of a search being delayed due to the lack of knowing where to search.

In view of the above circumstances, an exemplary object of the present invention is to provide technology that enables another person to know a route followed by a person who is moving about outdoors.

Means for Solving the Problem

A mobile-side terminal apparatus according to one exemplary aspect of the present invention includes: a route information storing unit that stores route information related to a route that a user follows; a position acquiring unit that acquires a present position of the user; a display unit that displays the route information stored in the route information storing unit and the present position acquired by the position acquiring unit; and a position transmitting unit that performs transmission of the present position acquired by the position acquiring unit to another information processing device that stores the route information and displays the route information and the present position.

A position transmission method according to one exemplary aspect of the present invention includes: a position acquisition step of acquiring a present position of a user by a mobile-side terminal apparatus including a route information storing unit that stores route information related to a route that the user follows; a display step of displaying, by the mobile-side terminal apparatus, the route information stored in the route information storing unit and the present position acquired by the position acquiring unit; and a position transmission step of performing transmission of the present position acquired by the position acquisition step from the mobile-side terminal apparatus to another information processing device that stores the route information and displays the route information and the present position.

A computer program according to one exemplary aspect of the present invention causes an information processing device including a route information storing unit that stores route information related to a route that a user follows, to execute: a position acquisition step of acquiring a present position of the user; a display step of displaying the route information stored in the route information storing unit and the present position acquired by the position acquiring unit; and a position transmission step of performing transmission of the present position acquired by the position acquisition step to another information processing device that stores the route information and displays the route information and the present position.

Effect of the Invention

According to the present invention, it is possible for another person to know the route followed by a person who is moving about outdoors.

BRIEF DESCRIPTION OF THE DRAWINGS

FIG. 9 is a schematic diagram that shows an outline of a position table of the second exemplary embodiment of the present invention.

EMBODIMENTS FOR CARRYING OUT THE INVENTION

First Exemplary Embodiment

Figure 1:
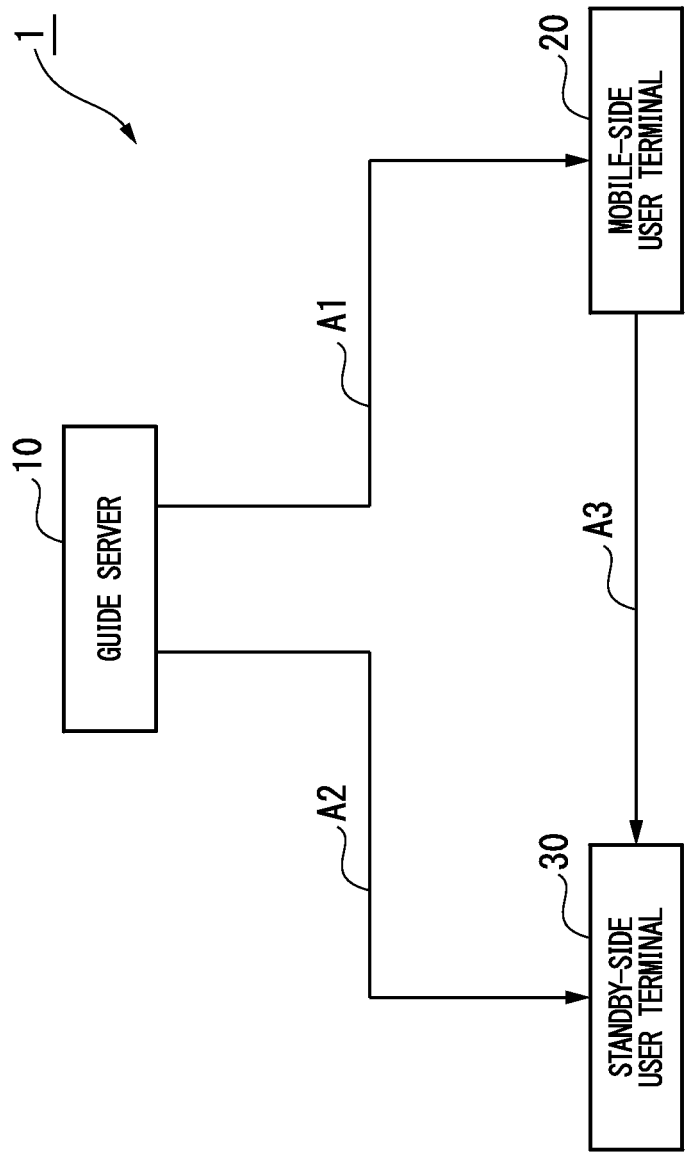
FIG. 1 is a system configuration diagram that shows the system configuration of a guide system of a first exemplary embodiment of the present invention.

FIG. 1 is a system configuration diagram that shows the system configuration of a guide system 1 according to a first exemplary embodiment of the present invention.

The guide system 1 includes a guide server 10, a mobile-side user terminal 20, and a stand-by side user terminal 30. The guide server 10, the mobile-side user terminal 20, and the stand-by side user terminal 30 are respectively connected to a network, and capable of communication with each other via the network. The guide server 10 is constituted using an information-processing device such as a main frame, a workstation, or a personal computer. The mobile-side user terminal 20 is constituted using a portable information-processing device such as a cellular telephone, a smartphone, a PDA (personal digital assistant), or a notebook-type personal computer. The mobile-side user terminal 20 includes a wireless communication function for accessing a network by wireless communication. The wireless communication function included in the mobile-side user terminal 20 may be a wireless communication function of any type. For example, it may be a wireless communication function for connecting to a cellular telephone network. It may also be a wireless communication function for connecting to a wireless LAN (local area network). It may also be a wireless communication function for connecting to a WiMAX (Worldwide Interoperability for Microwave Access) network. It may also be another wireless communication function. The standby-side user terminal 30 may be constituted using a portable information-processing device such as a cellular telephone, a smartphone, a PDA (personal digital assistant), or a notebook-type personal computer. The standby-side user terminal 30 may also be constituted using a stationary information-processing device such as an ordinary personal computer, a facsimile apparatus equipped with an information-processing function, or a game machine. Each information-processing device that operates as the mobile-side user terminal 20 and the standby-side user terminal 30 includes in advance a function that downloads the files of application programs from the guide server 10.

In FIG. 1, the guide server 10 transmits a route file to the mobile-side user terminal 20 (A1). The guide server 10 transmits a route file to the standby-side user terminal 30 (A2). The mobile-side user terminal 20 transmits the present position to the standby-side user terminal 30 (A3).

Figure 2:
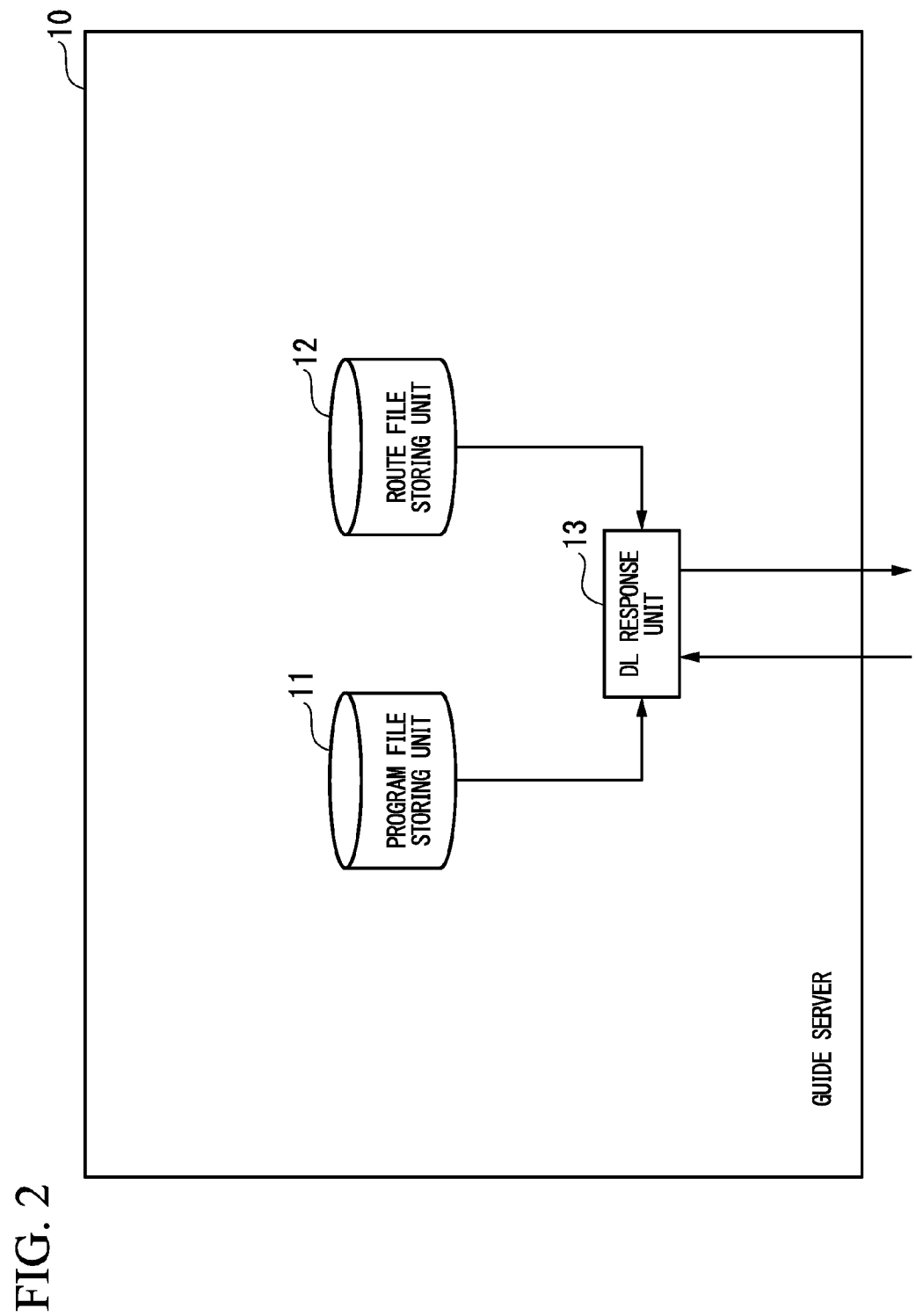
FIG. 2 is a schematic block diagram that shows the function configuration of a guide server of the first exemplary embodiment of the present invention.

FIG. 2 is a schematic block diagram that shows the function configuration of the guide server 10 of the first exemplary embodiment. The guide server 10 functions as a device that includes a program file storing unit 11, a route file storing unit 12, and a DL response unit 13 and the like, by executing programs for the guide server. The program file storing unit 11 and the route file storing unit 12 are constituted by using storage devices such as a magnetic hard disk drive or a semiconductor storage device.

The program file storing unit 11 stores files of mobile-side application programs and files of standby-side application programs. The mobile-side application programs are programs that are executed by the portable information-processing device, and are computer programs for causing the portable information-processing device to operate as the mobile-side user terminal 20. The standby-side application programs are programs that are executed by the information-processing device, and are computer programs for causing the information-processing device to operate as the standby-side user terminal 30.

The route file storing unit 12 stores one or a plurality of route files. A route file is a file recording information showing a route at a specific location outdoors. Examples of specific locations outdoors include a specific mountain, mountain range, mountain system, cave, field, grove, forest, river, swamp, lake, sea and the like. A route refers to a route from a specific starting point (for example, the start of a trail up a mountain at its foot) to an ending point (for example, the mountain summit) at each specific location. This route may be a route that is generally recommended. The route is expressed as an aggregate of information of latitude, longitude and altitude expressing each point of a plurality of points that are set on the route. The rule file may additionally record not only the route, but information relating to the map of the periphery of the route.

The DL response unit 13 responds to download requests for files that are stored in the program file storing unit 11 and the route file storing unit 12. Specifically, when the DL response unit 13 receives a download request for a mobile-side application program from another information-processing device via the network, it reads out the file of the mobile-side application program from the program file storing unit 11. Then, the DL response unit 13 transmits the read-out file to the requestor information-processing device. When the DL response unit 13 receives a download request for a standby-side application program from another information-processing device via the network, it reads out the file of the standby-side application program from the program file storing unit 11. Then, the DL response unit 13 transmits the read-out file to the requestor information-processing device. When the DL response unit 13 receives a download request for a route file from another information-processing device via the network, it reads out the designated route file from the route file storing unit 12. Then the DL response unit 13 transmits the read-out file to the requestor information-processing device.

Figure 3:
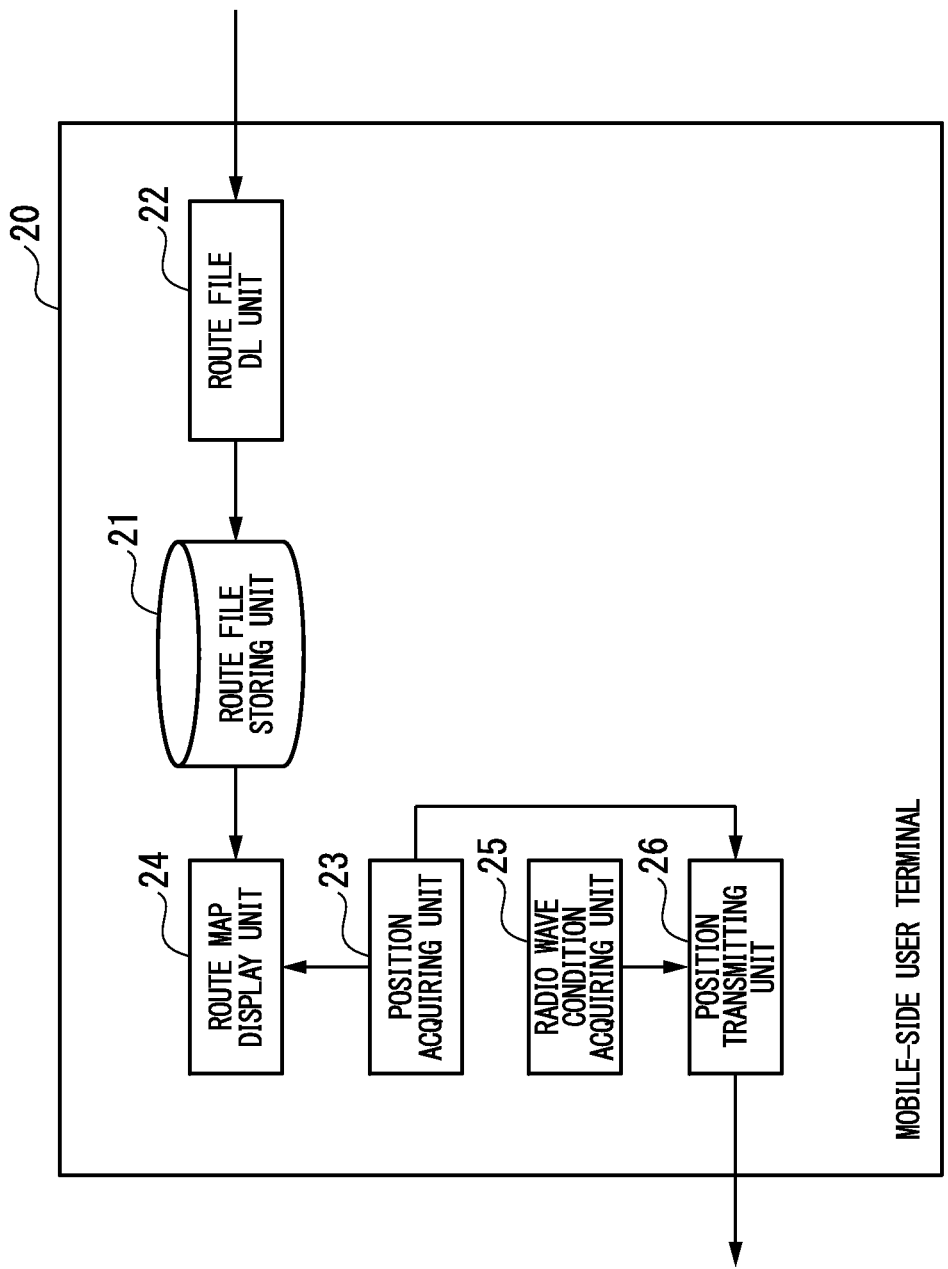
FIG. 3 is a schematic block diagram that shows the function configuration of a mobile-side user terminal of the first exemplary embodiment of the present invention.

FIG. 3 is a schematic block diagram that shows the function configuration of the mobile-side user terminal 20 of the first exemplary embodiment. The mobile-side user terminal 20 includes a CPU (Central Processing Unit), memory, and an auxiliary storage device that are connected by a bus. The mobile-side user terminal 20 executes mobile-side application programs. By executing mobile-side application programs, the mobile-side user terminal 20 functions as a device including a route file storing unit (route information storing unit) 21, a route file DL unit 22, a position acquiring unit 23, a route map display unit (display unit) 24, a radio wave condition acquiring unit (judging unit) 25, a position transmitting unit 26, and the like. All or a portion of the functions of the mobile-side user terminal 20 may be realized using hardware such as an ASIC (Application Specific Integrated Circuit), PLD (Programmable Logic Device) or FPGA (Field Programmable Gate Array).

The route file storing unit 21 is constituted using a storage device such as a magnetic hard disk drive or a semiconductor storage device or the like. The route file storing unit 21 stores route files downloaded from the guide server 10.

The route file DL unit 22 transmits a download request for a specific route file via the network to the guide server 10. The specific route file is for example a route file that relates to a route that the user of the mobile-side user terminal 20 has designated by operating an input device included in the mobile-side user terminal 20. The route file DL unit 22 writes the downloaded route file to the route file storing unit 21.

The position acquiring unit 23 includes a positioning function such as a GPS (Global Positioning System). The position acquiring unit 23 acquires the present position of the mobile-side user terminal 20. The present position is for example information that is expressed by the respective values of latitude, longitude and altitude.

The route map display unit 24 is constituted using an image display device. The route map display unit 24 reads out a route file that is stored in the route file storing unit 21, and displays a route or the like that is defined by the route file. An image display device is for example a device such as a CRT (Cathode Ray Tube) display, a liquid crystal display, an organic EL (Electro Luminescence) display, and the like. The route map display unit 24 displays the present position that has been acquired by the position acquiring unit 23. In the case of information relating to the map of the periphery of the route being recorded in the route file, the route map display unit 24 reads out information relating to the map from the route file, and in addition to displaying the map, displays the route and the present position on the map. In the case of information relating to the map of the periphery of the route not being recorded in the route file, the route map display unit 24 reads out map information that is recorded in a non-volatile storage device of the mobile-side user terminal 20 in advance, and in addition to displaying the map, displays the route and the present position on the map.

The radio wave condition acquiring unit 25 acquires information relating to the quality of the radio wave condition in the wireless propagation path for the mobile-side user terminal 20 to perform wireless communication. The radio wave condition acquiring unit 25 determines whether or not wireless communication is possible based on the acquired information. As described below, the data that the position transmitting unit 26 of the mobile-side user terminal 20 transmits is extremely small data, and so the transmission process is completed in a short time. For that reason, the radio wave condition acquiring unit 25 may be set so as to determine that transmission is possible even in a radio wave condition that is generally judged as being an adverse condition, provided it is possible to transmit this kind of small data. The specific criterion of judging whether or not transmission is possible is set in advance by the designer or the user. The radio wave condition acquiring unit 25 performs the determination of whether or not transmission is possible in accordance with the criterion that is set in advance.

The position transmitting unit 26 transmits to the standby-side user terminal 30 that is set in advance information that shows the present position that has been acquired by the position acquiring unit 23, in the case of the radio wave condition acquiring unit 25 having determined that transmission is possible. The specific transmission means of the position transmitting unit 26 transmitting information that expresses the present position to the standby-side user terminal 30 may be achieved in any manner. For example, the position transmitting unit 26 may write information expressing the present position in an e-mail or attach it thereto, and transmit the e-mail. In this case, the position transmitting unit 26 stores the mail address of the e-mail that is received by the standby-side user terminal 30 in advance. Then, the position transmitting unit 26 transmits the aforementioned e-mail to this mail address. The position transmitting unit 26 may transmit the present position using an instant messenger. The position transmitting unit 26 may transmit the present position via SNS (Social Network Service).

Figure 4:
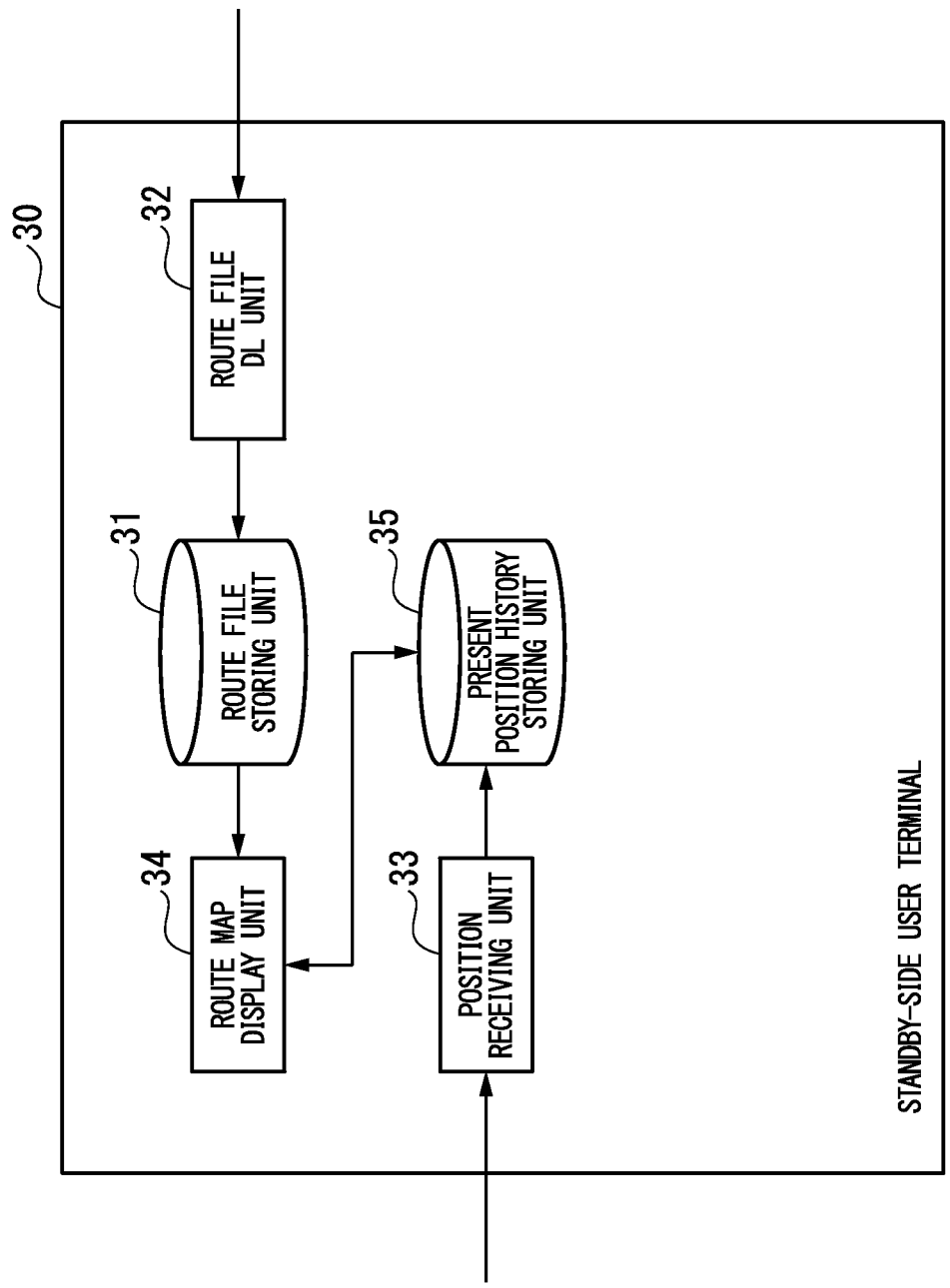
FIG. 4 is a schematic block diagram that shows the function configuration of a standby-side user terminal of the first exemplary embodiment of the present invention.

FIG. 4 is a schematic block diagram that shows the function configuration of the standby-side user terminal 30 of the first exemplary embodiment. The standby-side user terminal 30 includes a CPU, memory, and an auxiliary storage device and the like that are connected by a bus. The standby-side user terminal 30 executes standby-side application programs. The standby-side user terminal 30, by executing standby-side application programs, functions as a route file storing unit 31, a route file DL unit 32, a position receiving unit 33, a route map display unit 34, a present position history storing unit 35, and the like. All or a portion of the functions of the standby-side user terminal 30 may be realized using hardware such as ASIC, PLD, FPGA or the like.

The route file storing unit 31 is constituted using a storage device such as a magnetic hard disk drive or a semiconductor storage device. The route file storing unit 31 stores route files downloaded from the guide server 10.

The route file DL unit 32 transmits a download request for a specific route file via the network to the guide server 10. The specific route file is for example a route file that relates to a route that the user of the standby-side user terminal 30 has designated by operating an input device that is included in the standby-side user terminal 30. The route file DL unit 32 may be constituted so as to transmit the download request for a route file of a route that relates to the present position that has been received by the position received unit 33 described below. The route file DL unit 32 writes the downloaded route file to the route file storing unit 31.

The position receiving unit 33 receives the present position via the network from the mobile-side user terminal 20. For example, in the case of the present position being transmitted by e-mail, the position receiving unit 33 receives the e-mail by accessing a predetermined POP server. The position receiving unit 33, in the case of receiving various e-mails in addition to the e-mail that has been transmitted from the mobile side user terminal 20, searches for the mail that has been transmitted from the mobile-side user terminal 20 based on the transmission source mail address that has been set in advance. The position receiving unit 33 extracts the information of the present position from the e-mail. In the case of the present position being transmitted via instant messenger or SNS, the position receiving unit 33 receives the message via instant messenger or SNS, and extracts the information of the present position from the message that has been received. The position receiving unit 33 writes the present position that has been extracted to the present position history storing unit 35.

The route map display unit 34 is constituted using an image display device. The route map display unit 34 reads out a route file that is stored in the route file storing unit 31, and displays a route that is defined by the route file. An image display device is for example a device such as a CRT display, a liquid crystal display, an organic EL display, and the like. The route map display unit 34 displays the present position that has been stored in the present position history storing unit 35 described below. In the case of information relating to the map of the periphery of the route being recorded in the route file, the route map display unit 34 reads out the information relating to the map from the route file, and in addition to displaying the map, displays the route and the present position on the map. In the case of information relating to the map of the periphery of the route not being recorded in the route file, the route map display unit 34 reads out map information that is recorded in a non-volatile storage device of the standby-side user terminal 30 in advance, and in addition to displaying the map, displays the route and the present position on the map.

The present position history storing unit 35 is constituted using a storage device such as a magnetic hard disk drive or a semiconductor storage device. The present position history storing unit 35 stores information of the present position that is received by the position receiving unit 33. At this time, the present position history storing unit 35 may be constituted so as to store information of the present position in correspondence with the clock time. The aforementioned clock time means any one or a plurality of the time at which the present position is acquired in the mobile-side user terminal 20, the time at which the present position is transmitted from the mobile-side user terminal 20, the time at which the present position is received by the position receiving unit 33, and the like. In the case of the time at which the present position is acquired in the mobile-side user terminal 20 and the time at which the present position is transmitted from the mobile-side user terminal 20 being recorded, these times are transmitted from the mobile-side user terminal 20.

Figure 5:
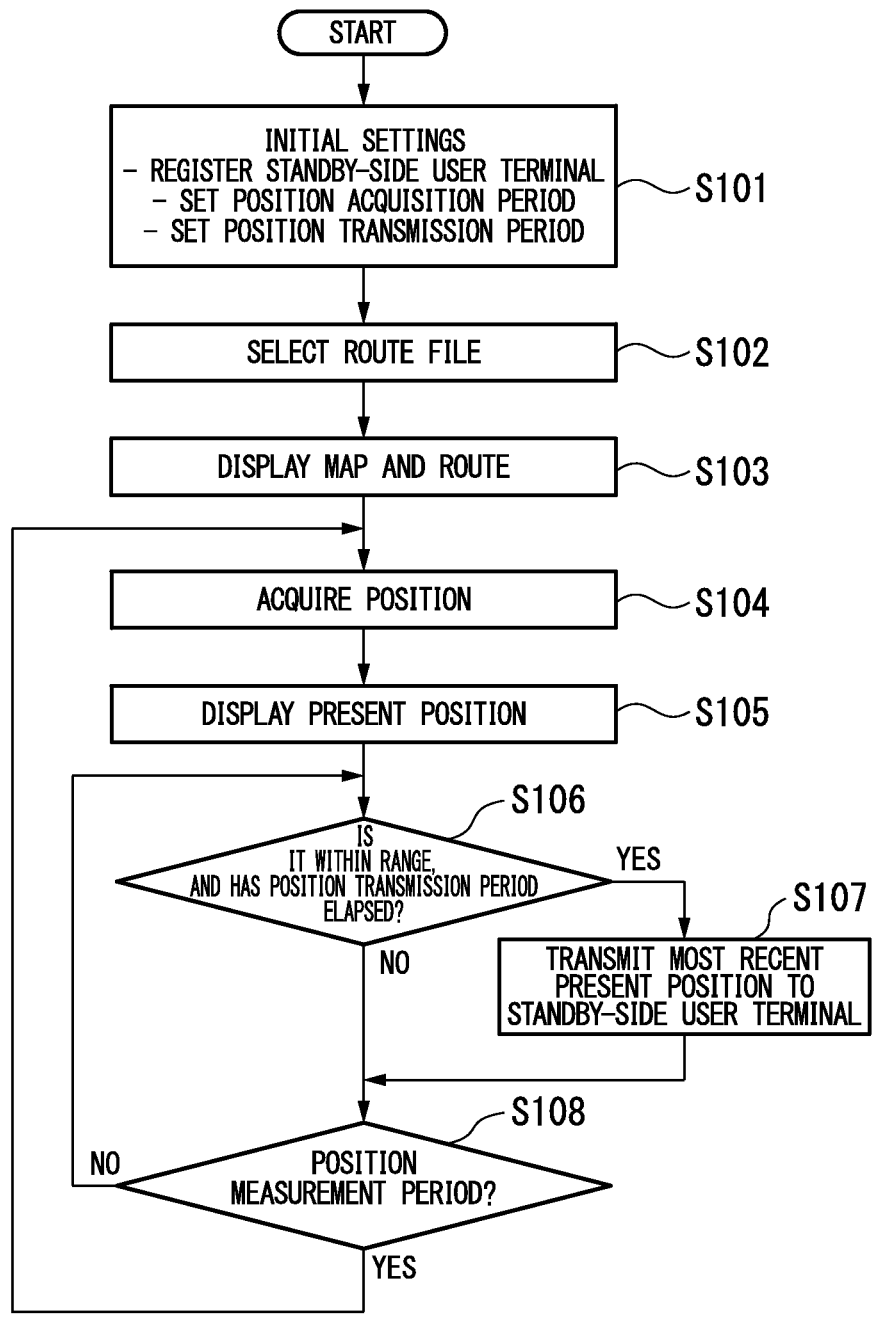
FIG. 5 is a flowchart that shows the flow of the operations of the mobile-side user terminal of the first exemplary embodiment of the present invention.

FIG. 5 is a flowchart that shows the flow of the operations of the mobile-side user terminal 20 of the first exemplary embodiment. First, when the mobile-side application program is launched in the mobile-side user terminal 20, a screen for performing initial settings is displayed. The user of the mobile-side user terminal 20 performs initial settings using an input device that is included in the mobile-side user terminal 20. Specifically, registration of the standby-side user terminal, setting of the position acquisition period, setting of the position transmission period, and the like are performed (Step S101). In the case of all of the standby-side user terminal, the position acquisition period, the position transmission period being already set and there being no need for updating, the processing of the initial settings may be omitted. In the case of some of the standby-side user terminal, the position acquisition period, the position transmission period being already set and there being no need for updating, the setting process relating to the items that have already been set may be omitted.

Registration of the standby-side user terminal means registering the address information of the standby-side user terminal 30 that becomes the address to which the position transmitting unit 26 transmits the present position. For example, in the case of the position transmitting unit 26 transmitting the present position using e-mail, in the registration of the standby-side user terminal, the mail address of e-mail that the standby-side user terminal 30 can receive is set. In the case of the position transmitting unit 26 transmitting the present position via instant messenger or SNS, in the registration of the standby-side user terminal, the user ID for specifying the standby-side user terminal 30 is set. The position acquisition period is the period in which the position acquiring unit 23 acquires the present position. The position transmission period is the period in which the position transmitting unit 26 transmits the present position.

Next, the screen for selecting a route file is displayed. The user of the mobile-side user terminal 20 selects the route file relating to the route that the user intends to follow from now, from among the route files that are stored in the route file storing unit 21, using the input device that is included in the mobile-side user terminal 20 (Step S102). When the route file selection is made, the route map display unit 24 reads out the selected route file from the route file storing unit 21, and displays the map of the route periphery and the route (Step S103).

Next, the position acquiring unit 23 acquires the present position (Step S104). Next, the route map display unit 24 displays the present position that has been acquired by the position acquiring unit 23 on the map (Step S105). Next, the position transmitting unit 26 determines whether or not the position transmission period has elapsed from the point in time of the last time of transmitting the present position. Also, the position transmitting unit 26 determines whether or not the radio wave condition acquiring unit 25 has determined that transmission is possible. In the case of the position transmission period having elapsed, and transmission being determined to be possible (Step S106—YES), the position transmitting unit 26 transmits the most recent present position to the standby-side user terminal 30 that has been set in the initial settings process (Step S107). On the other hand, in the case of the position transmission period having not elapsed, or transmission not being determined to be possible (Step S106—NO), the position transmitting unit 26 does not perform transmission of the present position. In the initial determination of the Step S106 upon the mobile-side application program being launched, the position transmitting unit 26 may be constituted so as to determine that the position transmission period has elapsed. The radio wave condition acquiring unit 25 continuously performs a determination of the radio wave condition, in a shorter period than the position transmission period.

After that, the position acquiring unit 23 determines whether or not the position acquisition period has elapsed from the point in time of the last time of acquiring the present position. In the case of the position acquisition period not having yet elapsed (Step S108—NO), it returns to the process of Step S106. On the other hand, in the case of the position acquisition period having elapsed (Step S108—YES), it proceeds to the process of Step S104.

Figure 6:
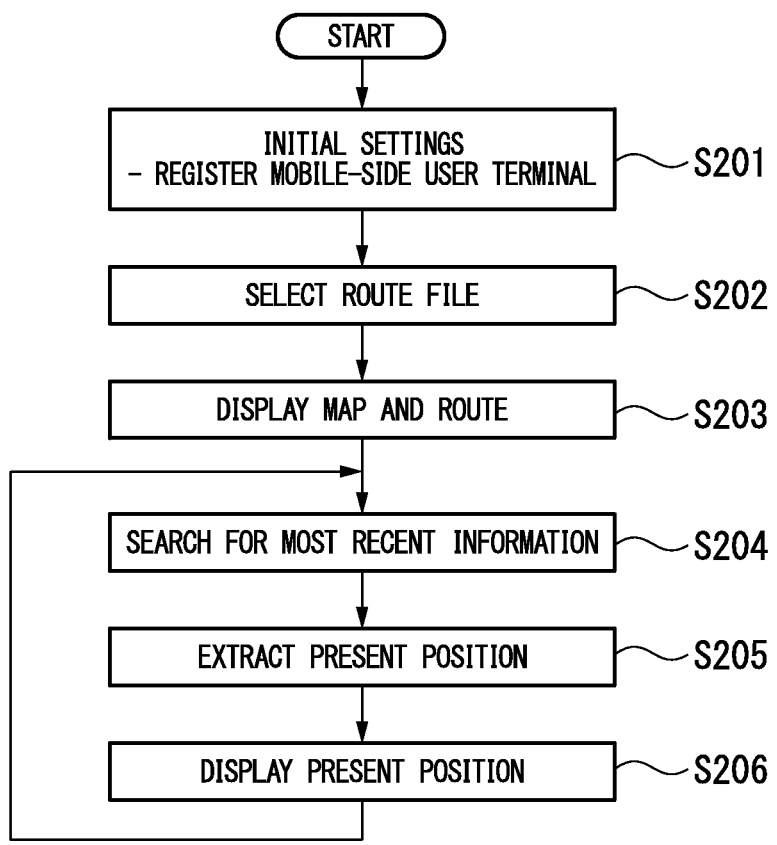
FIG. 6 is a flowchart that shows the flow of the operations of the standby-side user terminal of the first exemplary embodiment of the present invention.

FIG. 6 is a flowchart that shows the flow of the operations of the standby-side user terminal 30 of the first exemplary embodiment. First, when the standby-side application program is launched in the standby-side user terminal 30, a screen for performing initial settings is displayed. The user of the standby-side user terminal 30 performs initial settings using an input device that is included in the standby-side user terminal 30. Specifically, registration of the mobile-side user terminal is performed (Step S201). In the case of the mobile-side user terminal already being set, and there being no need for a change, the process of the initial settings may be omitted. Registration of the mobile-side user terminal means registering identification information of the mobile-side user terminal 20, which is to be the transmission source, from which the position receiving unit 33 receives the present position. For example, in the case of receiving the present position using e-mail, in the registration of the mobile-side user terminal, the transmission source mail address of the e-mail to be used when the mobile-side user terminal 20 transmits is set in the registration of the mobile-side user terminal.

Next, the screen for selecting a route file is displayed. The user of the standby-side user terminal 30 selects the route file relating to the route that corresponds to the present position that the user intends to receive from now, from among the route files that are stored in the route file storing unit 31, using the input device that is included in the standby-side user terminal 30 (Step S202). When the selection of the route file is made, the route map display unit 34 reads out the selected route file from the route file storing unit 31, and displays the map of the route periphery and the route (Step S203).

Next, the route map display unit 34 refers to the recorded content of the present position history storing unit 35, and searches for information of the most recent present position (Step S204). Then, the route map display unit 34 displays the present position that has been searched (Step S206). After the process of the Step S206, it again returns to the process of S204 (Step S206). In the case of the present position history storing unit 35 storing not the present position itself but rather e-mails or messages that include the present position, the route map display unit 34 needs to perform a process of extracting information of the present position from the e-mail or message between the processing of Step S204 and Step S206 (Step S205).

Next, an effect of the guide system 1 of the first exemplary embodiment that is constituted in the above manner shall be described. Conventionally, it was necessary for the route that the user intends to pass to ordinarily be created by the user himself. For this purpose, the user has needed to spend time and effort on creation of a route. In contrast, in the guide system 1 of the first exemplary embodiment, there is no need for route information to be created by the user himself. For that reason, it is possible for the user to more easily make one's way to a desired spot by following a route. Also, it is possible to prevent the occurrence of accidents due to users who are unfamiliar with the selection of a route setting an incorrect route.

Also, in the guide system 1, in the case of the radio wave condition being good, the present position is transmitted automatically at a predetermined period (position transmission period) regardless of the operation by the user. The present position that has been transmitted is stored as history in the standby-side user terminal 30 that is set in advance, and displayed. For that reason, a third party who has the standby-side user terminal 30 is capable of knowing the present location of the user of the mobile-side user terminal 20 and the route he/she has followed.

Modified Example

The mobile-side application program and the standby-side application program may be constituted as one application program. In this case, an information processing device, by executing the application program, is capable of operating as the mobile-side user terminal 20 and the standby-side user terminal 30.

Second Exemplary Embodiment

Figure 7:
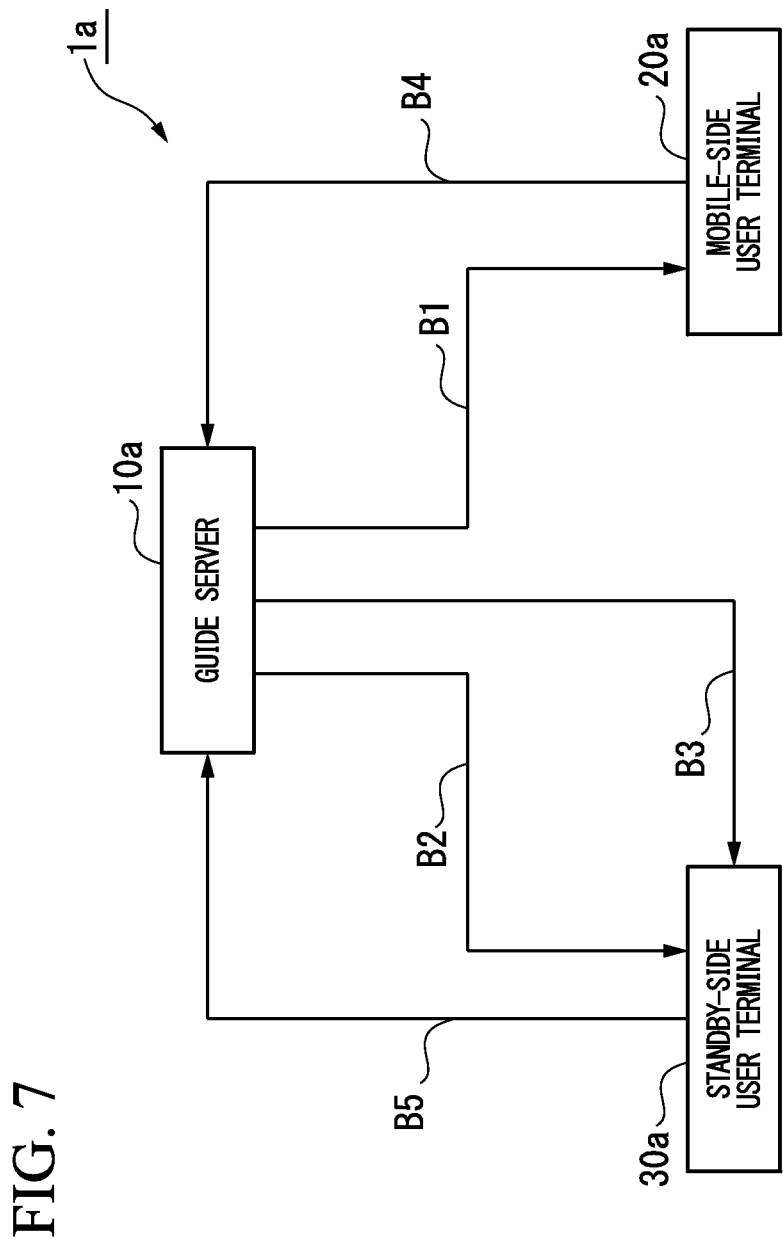
FIG. 7 is a system configuration diagram that shows the system configuration of a guide system of a second exemplary embodiment of the present invention.

FIG. 7 is a system configuration diagram that shows the system configuration of a guide system 1a according to a second exemplary embodiment of the present invention. The guide system 1a includes a guide server 10a, a mobile-side user terminal 20a, and a standby-side user terminal 30a. Hereinbelow, the respective constitutions of the guide server 10a, the mobile side user terminal 20a, and the standby-side user terminal 30a that differ from the guide server 10, the mobile-side user terminal 20, and the standby-side user terminal 30 in the guide system 1 of the first exemplary embodiment shall be described, with descriptions of the same constitutions being omitted.

In FIG. 7, the guide server 10a transmits a route file to the mobile-side user terminal 20a (B1). The guide server 10a transmits a route file to the standby-side user terminal 30a (B2). The guide server 10a transmits the present position to the standby-side user terminal 30a (B3). The mobile-side user terminal 20a transmits the present position and mobile person identification information to the guide server 10a (B4). The standby-side user terminal 30a transmits a position request (mobile person identification information) to the guide server 10a (B5).

Figure 8:
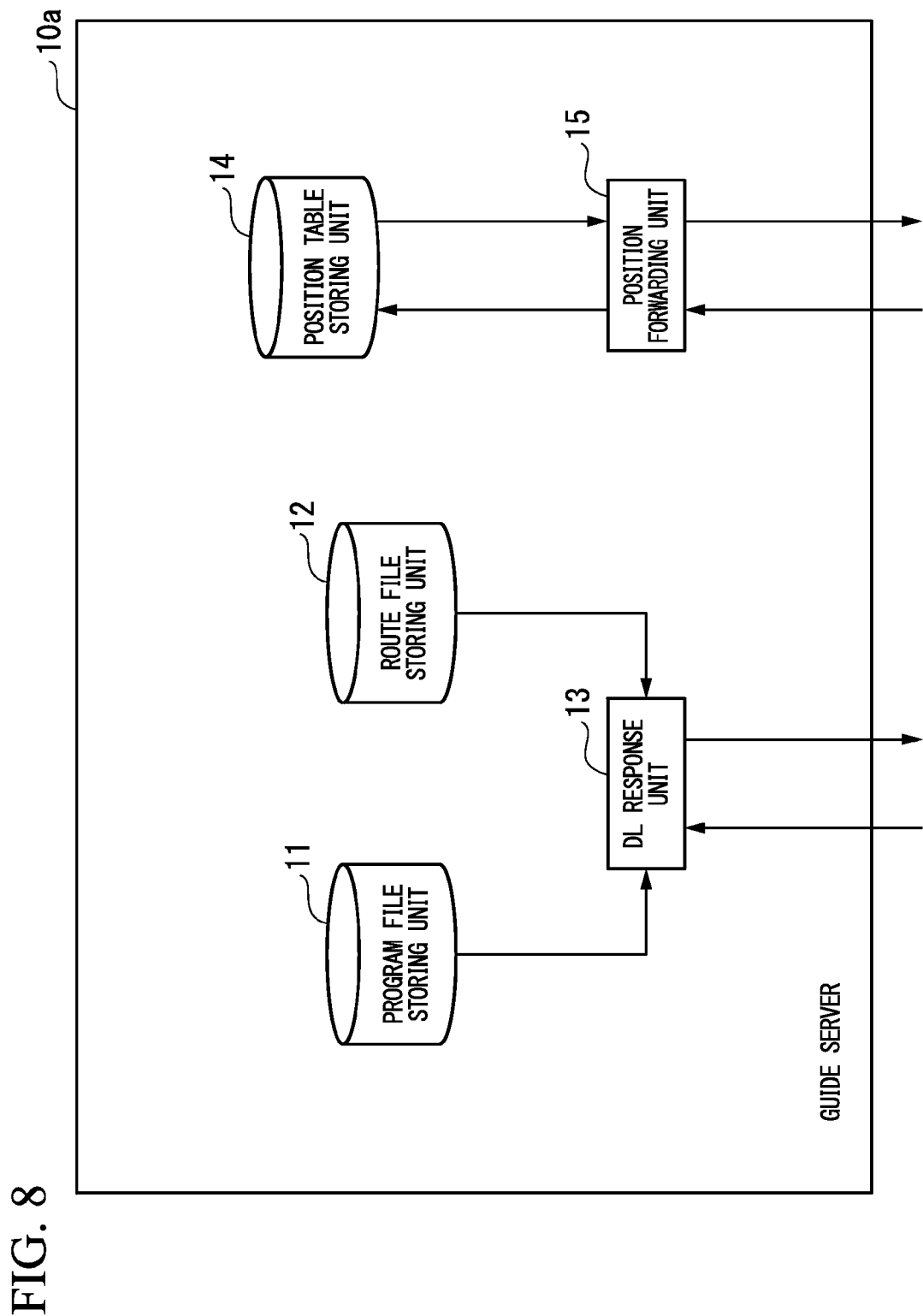
FIG. 8 is a schematic block diagram that shows the function configuration of a guide server of the second exemplary embodiment of the present invention.

FIG. 8 is a schematic block diagram that shows the function configuration of the guide server 10a of the second exemplary embodiment.

The guide server 10a differs from the guide server 10 on the point of further including a position table storing unit 14 and a position forwarding unit 15. The other constitutions of the guide server 10a are the same as the guide server 10.

The position table storing unit 14 is constituted using a storage device such as a magnetic hard disk drive or a semiconductor storage device. The position table storing unit 14 stores a position table. FIG. 9 is a schematic diagram that shows an outline of the position table. The position table contains mobile person identification information and the present position in a corresponding manner. The mobile person identification information is identification information for identifying the user of the mobile-side user terminal 20a. The mobile person identification information may be constituted using any kind of information. The mobile person identification information may for example be an ID that is given to each user of the mobile-side user terminals 20a. The mobile person identification information may be the transmission source mail address of the e-mail used when the mobile-side user terminal 20a makes a transmission. The present position shows the most recent present position of the mobile person (user) that is identified by the corresponding mobile person identification information. The position table storing unit 14 may be constituted so as to record not only the most recent present position but also the history of past present positions.

Returning to FIG. 8, the description regarding the constitution of the guide server 10a of the second exemplary embodiment shall be continued. The position forwarding unit 15 receives the present position and mobile person identification information from the mobile side user terminal 20a, and updates the position table storing unit 14 based on the received information. The position forwarding unit 15, upon receiving a position request from the standby-side user terminal 30a, reads out the present position corresponding to the mobile person identification information that is included in the position request from the position table storing unit 14. The position forwarding unit 15 transmits the present position that has been read out to the standby-side user terminal 30a.

Figure 10:
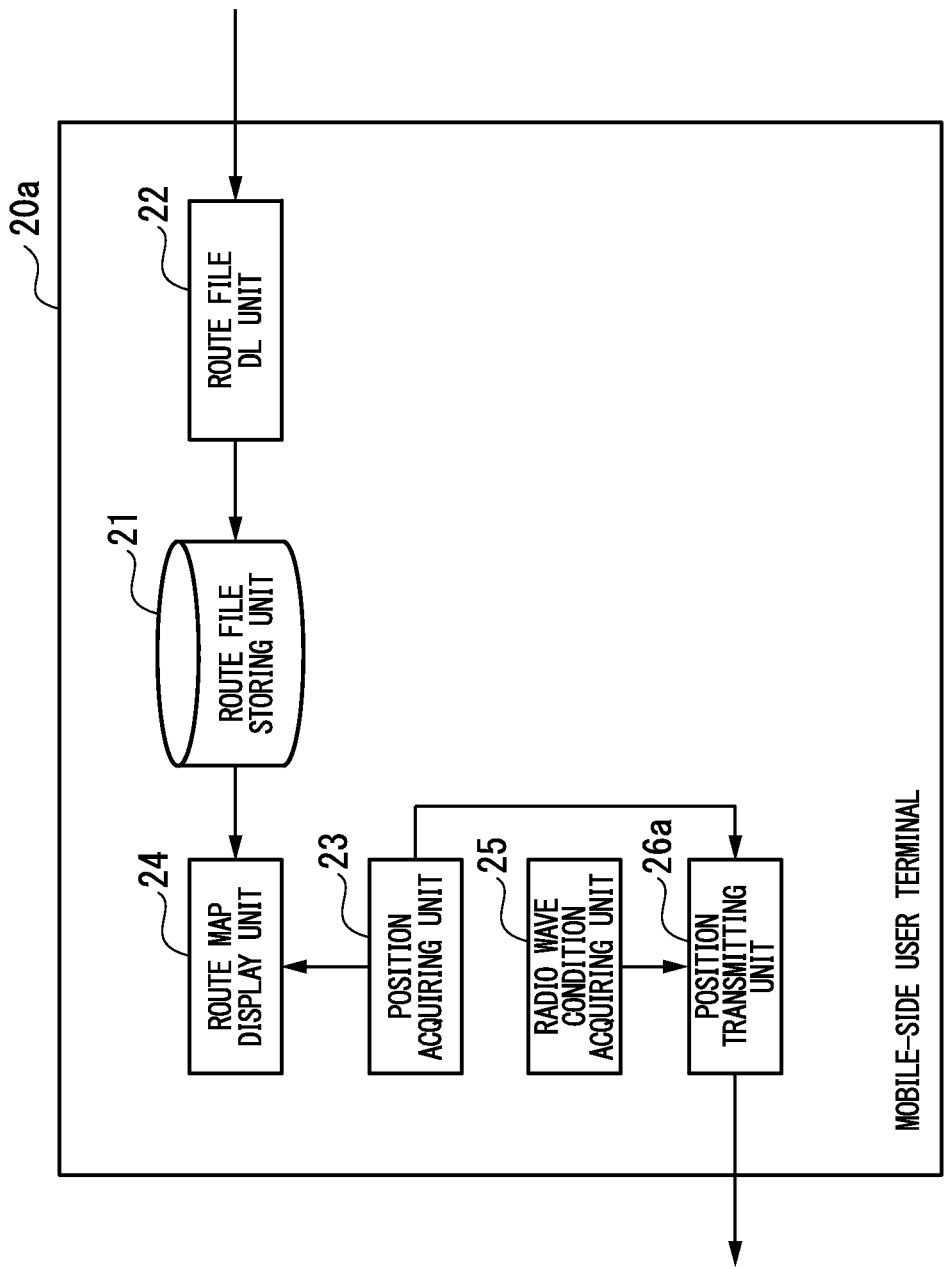
FIG. 10 is a schematic block diagram that shows the function configuration of a mobile-side user terminal of the second exemplary embodiment of the present invention.

FIG. 10 is a schematic block diagram that shows the function configuration of the mobile-side user terminal 20a of the second exemplary embodiment. The mobile-side user terminal 20a differs from the mobile-side user terminal 20 on the point of including a position transmitting unit 26a instead of the position transmitting unit 26. The other constitutions of the mobile-side user terminal 20a are the same as the mobile-side user terminal 20.

The position transmitting unit 26a differs from the position transmitting unit 26 on the point of transmitting information that expresses the present position that has been acquired by the position acquiring unit 23 to the guide server 10a that has been set in advance, and not to the standby-side user terminal 30 that has been set in advance. The other constitutions of the position transmitting unit 26a are the same as the position transmitting unit 26.

Figure 11:
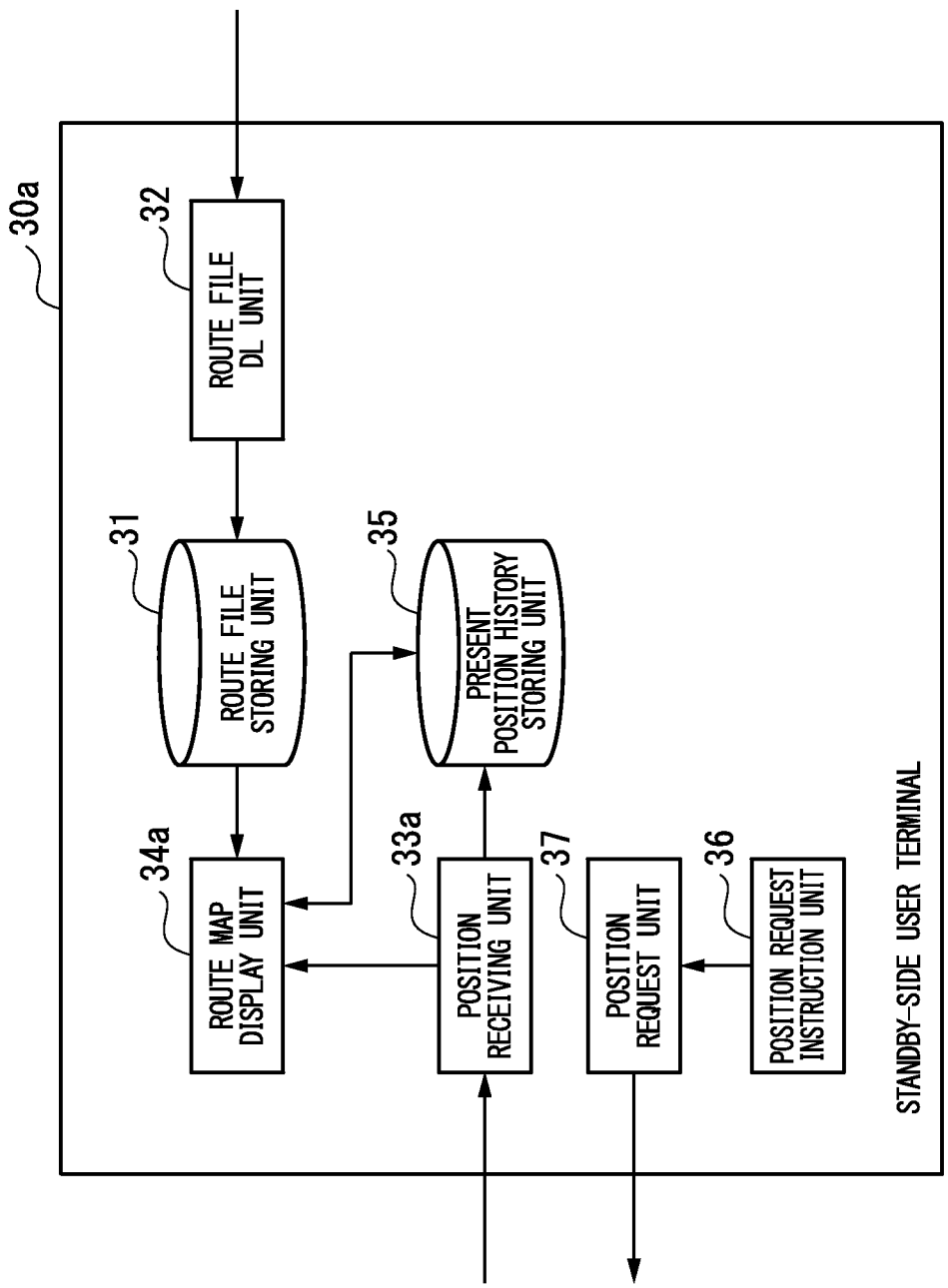
FIG. 11 is a schematic block diagram that shows the function configuration of a standby-side user terminal of the second exemplary embodiment of the present invention.

FIG. 11 is a schematic block diagram that shows the function configuration of the standby-side user terminal 30a of the second exemplary embodiment. The standby-side user terminal 30a differs from the standby-side user terminal 30 on the point of including a position receiving unit 33a instead of the position receiving unit 33, on the point of including a route map display unit 34a instead of the route map display unit 34, and on the point of further including the position request instruction unit 36 and the position request unit 37. The other constitutions of the standby-side user terminal 30a are the same as the standby-side user terminal 30.

The position request instruction unit 36 is constituted using an input device. The position request instruction unit 36 accepts position request instructions by the user of the standby-side user terminal 30a. The input device is an existing device such as a keyboard, a pointing device (mouse, tablet and the like), button, touch panel.

When a position request instruction is input via the position request instruction unit 36, the position request unit 37 generates a position request that includes the mobile person identification information that is set in advance. The position request unit 37 transmits the generated position request to the guide server 10a.

The position receiving unit 33a receives the present position that the guide server 10a transmits in accordance with the position request. The position receiving unit 33a gives notice of the received present position to the route map display unit 34a. Also, the position receiving unit 33a records the present position that has been received in the present position history storing unit 35.

The route map display unit 34a differs from the route map display unit 34 on the point of displaying the present position on a map based on the present position that has been notified upon receiving the notification of the present position from the position receiving unit 33a. The other constitutions of the route map display unit 34a are the same as the route map display unit 34.

Figure 12:
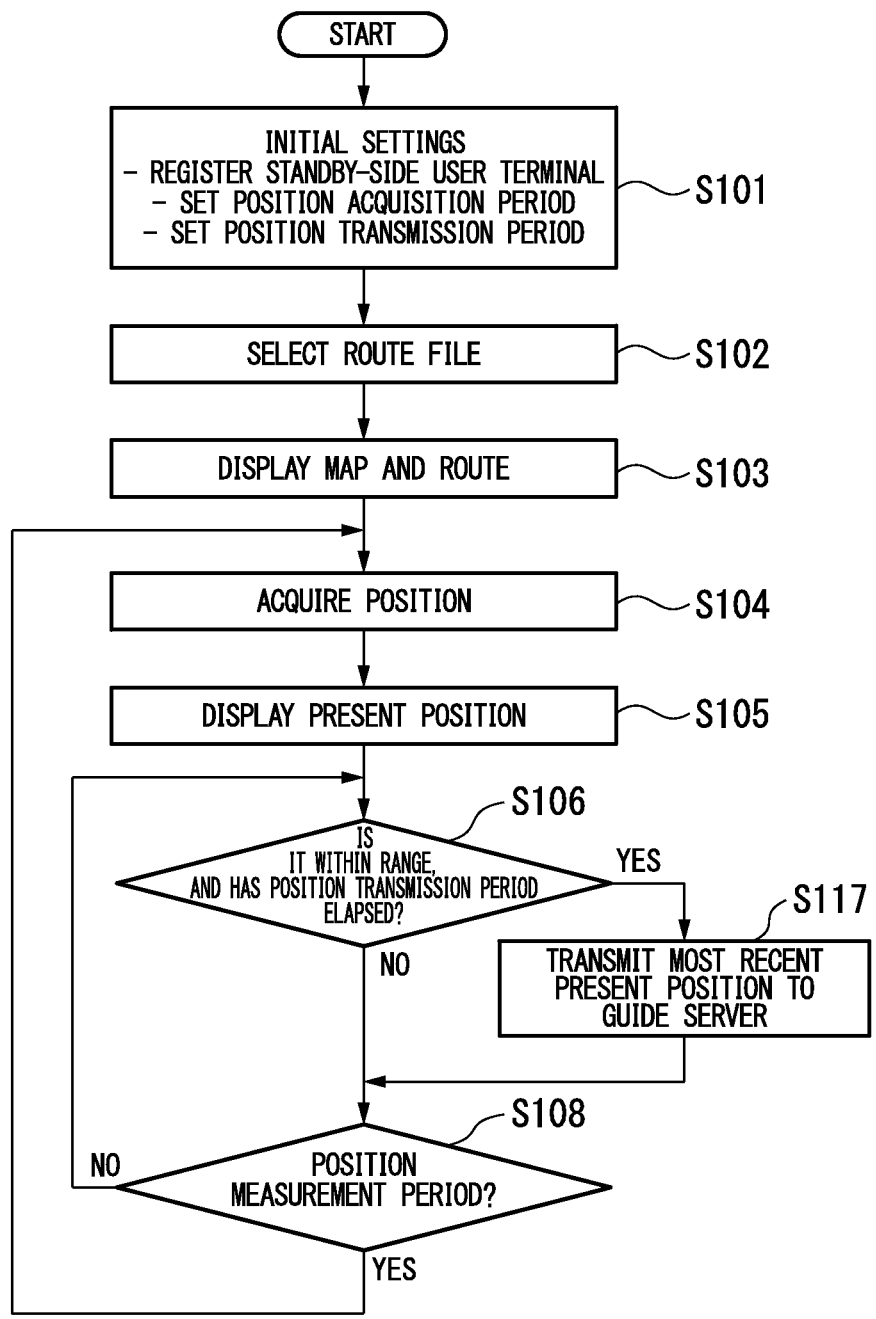
FIG. 12 is a flowchart that shows the flow of the operations of the mobile-side user terminal of the second exemplary embodiment of the present invention.

FIG. 12 is a flowchart that shows the flow of the operations of the mobile-side user terminal 20a of the second exemplary embodiment. In FIG. 12, the processes that are the same as the mobile-side user terminal 20 of the first exemplary embodiment are denoted by the same reference symbols. In the following explanation, descriptions of the same processes as in the mobile-side user terminal 20 of the first exemplary embodiment are omitted.

In the process of Step S106, in the case of the position transmission period having elapsed, and transmission being judged as possible (Step S106—YES), the position transmitting unit 26a transmits the most recent present position to the guide server 10a that has been set in advance (Step S117). The other processes are the same as the operation of the mobile-side user terminal 20 of the first exemplary embodiment.

Figure 13:
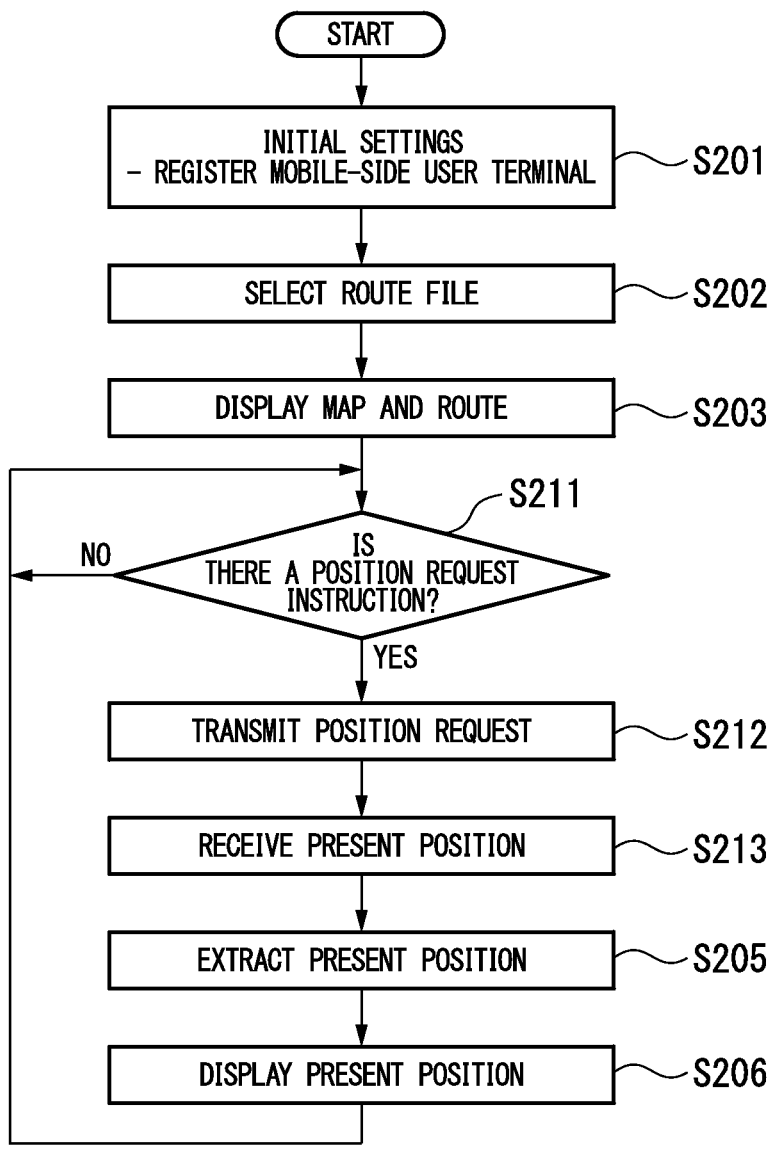
FIG. 13 is a flowchart that shows the flow of the operations of the standby-side user terminal of the second exemplary embodiment of the present invention.

FIG. 13 is a flowchart that shows the flow of the operations of the standby-side user terminal 30a of the second exemplary embodiment. In FIG. 13, those processes that are the same as in the standby-side user terminal 30 of the first exemplary embodiment are denoted by the same reference symbols. In the following description, descriptions of the same processes as the standby-side user terminal 30 of the first exemplary embodiment shall be omitted.

The position request unit 37 stands by until a position request instruction is input via the position request instruction unit 36 (Step S211—NO). On the other hand, when a position request instruction is input via the position request instruction unit 36 (Step S211—YES), the position request unit 37 generates and transmits a position request (Step S212). The position receiving unit 33a receives the present position that is transmitted from the guide server 10a in accordance with the position request (Step S213). Thereafter, the processes from Step S205 onward are executed.

In the guide system 1a of the second exemplary embodiment, the mobile-side user terminal 20a transmits the most recent present position not to the standby-side user terminal 30a but to the guide server 10a. In the event of wanting to know the position of a mobile person, the user of the standby-side user terminal 30a, by inputting a position request instruction, can acquire the most recent present position that is recorded in the guide server 10a and view its display. For that reason, it is possible to prevent information of the present position being transmitted to the standby-side user terminal 30a on a frequent basis.

A program for realizing the functions of the guide server 10, the mobile-side user terminal 20, and the standby-side user terminal 30 shown in FIG. 1 may be recorded on a computer-readable recording medium, and by reading the program that is recorded on this recording medium into a computer system and running it, the aforementioned processes may be executed on these devices. Also, a program for realizing the functions of the guide server 10a, the mobile-side user terminal 20a, and the standby-side user terminal 30a shown in FIG. 7 may be recorded on a computer-readable recording medium, and by reading the program that is recorded on this recording medium into a computer system and running it, processes may be executed on these devices for providing position information to the aforementioned users.

Note that a "computer system" here includes an OS and hardware such as peripheral devices. In the case of using a WWW system, a "computer system" includes a home page providing environment (or display environment).

The "computer-readable recording medium" means a portable medium such as a flexible disk, magneto-optical disk, ROM, CD-ROM and the like, and a storage device such as a hard disk that is housed in a computer system. The "computer-readable recording medium" also includes one that dynamically holds a program for a short time such as a communication line for transmitting a program through a network such as the Internet or the like or a communication line such as a telephone line or the like, and also includes one that holds the program for a certain time, such as a volatile memory in a computer system which functions as a server or client. The abovementioned program may be one for realizing a section of the abovementioned functions, and it is also possible to realize the abovementioned functions in combination with a program that has already been stored in the computer system.

The present invention was described above with reference to the exemplary embodiments, but the present invention is not limited to the above-described exemplary embodiments. Various modifications that will be understood by one of ordinary skill in the art can be made within the scope of the present invention to the constitution and details of the present invention.

This application is based upon and claims the benefit of priority from Japanese patent application No. 2010-107465, filed May 7, 2010, the disclosure of which is incorporated herein in its entirety by reference.

INDUSTRIAL APPLICABILITY

The present invention can be applied to a mobile-side terminal apparatus, a position transmission method, and a computer program. With this mobile-side terminal apparatus, position transmission method, and computer program, it is possible for another person to know the route followed by a person who is moving about outdoors.

DESCRIPTION OF REFERENCE SYMBOLS 1, 1a Guide system
10, 10a Guide server
20, 20a Mobile-side user terminals 30, 30a Standby-side user terminal
11 Program file storing unit
12 Route file storing unit
13 DL response unit
14 Position table storing unit
15 Position forwarding unit
21 Route file storing unit
22 Route file DL unit
23 Position acquiring unit
24 Route map display unit (display unit)
25 Radio wave condition acquiring unit (judging unit)
26, 26a Position transmitting unit
31 Route file storing unit (route information storing unit)
32 Route file DL unit
33, 33a Position receiving unit
34, 34a Route map display unit
35 Present position history storing unit
36 Position request instruction unit
37 Position request unit

The invention claimed is:

1. A guide system comprising a guide server, a mobile-side terminal apparatus, and a standby-side user terminal apparatus being independent of each other and communicating to each other via a network,
the mobile-side terminal apparatus comprising:
a route information storing unit that stores first route information showing a route that a user of the mobile-side terminal apparatus follows;
a position acquiring unit that acquires a present position of the mobile-side terminal apparatus;
a display unit that displays the route shown by the first route information and the present position of the mobile-side terminal apparatus; and
a position transmitting unit that transmits only information showing the present position of the mobile-side terminal apparatus to the standby-side user terminal apparatus,
the guide server comprising:
a response unit that transmits to the standby-side terminal apparatus only a second route information showing a route related to the present position of the mobile-side terminal apparatus without transmitting to the standby-side terminal apparatus the information showing the present position of the mobile-side terminal apparatus,
the standby-side user terminal apparatus comprising:
a position receiving unit that receives, from the mobile-side terminal apparatus, the information showing the present position of the mobile-side terminal apparatus;
a download unit that receives, from the guide server, the second route information; and
a display unit that displays the route shown by the second route information and the present position of the mobile-side terminal apparatus.

2. The guide system according to claim 1, wherein the mobile-side terminal apparatus further comprises:
a judging unit that judges whether or not transmission is possible with regard to a wireless propagation path that the position transmitting unit uses when transmitting the information showing the present position,
wherein the position transmitting unit transmits the information showing the present position of the mobile-side terminal apparatus in a case of the judging unit judging that transmission is possible.

3. The guide system according to claim 2, wherein the position transmitting unit transmits the information showing the present position in a case of a time relating to a position transmission period set in advance having elapsed from a point in time of last time the position transmitting unit transmitted the information showing the present position of the mobile-side terminal apparatus, and the judging unit judging that transmission is possible.

4. The guide system according to claim 1, wherein the mobile-side terminal apparatus registers the standby-side terminal apparatus as the terminal for receiving the information showing the present position acquired by the position acquiring unit.

5. The guide system according to claim 1, wherein mobile-side terminal apparatus transmits the information showing the present position via an email, an instant messenger, or Social Network Service.

6. The guide system according to claim 1, wherein the mobile-side terminal apparatus directly transmits the information showing the present position to the standby-side terminal apparatus.

7. The guide system according to claim 1, wherein the mobile-side terminal apparatus transmits the information showing the present position to the standby-side terminal apparatus.

8. The guide system according to claim 1, wherein the mobile-side terminal apparatus further comprises a download unit that receives, from the guide server, the first route information showing the route that the user of the mobile-side terminal apparatus follows.

9. The guide system according to claim 1, wherein the position transmitting unit transmits only the information showing the present position of the mobile-side terminal apparatus to the standby-side user terminal apparatus without the position transmitting unit transmitting the second route information to the standby-user terminal apparatus.

10. A guide method for a guide system including a guide server, a mobile-side terminal apparatus, and a standby-side user terminal apparatus being independent of each other and communicating to each other via a network, the method comprising:
storing, by the mobile-side terminal apparatus, first route information showing a route that a user of the mobile-side terminal apparatus follows;
acquiring a present position of the mobile-side terminal apparatus by the mobile-side terminal apparatus;
displaying, by the mobile-side terminal apparatus, the route shown by the first route information and the present position of the mobile-side terminal apparatus;
transmitting only information showing the present position of the mobile-side terminal apparatus from the mobile-side terminal apparatus to the standby-side user terminal apparatus;
transmitting, by the guide server, to the standby-side terminal apparatus only a second route information showing a route related to the present position of the mobile-side terminal apparatus without transmitting, by the guide server, to the standby-side terminal apparatus the information showing the present position of the mobile-side terminal apparatus;
receiving, from the mobile-side terminal apparatus, the information showing the present position of the mobile-side terminal apparatus by the standby-side user terminal apparatus;
receiving, from the guide server, the second route information by the standby-side user terminal apparatus; and
displaying the route shown by the second route information and the present position of the mobile-side terminal apparatus, by the standby-side user terminal apparatus.

11. A non-transitory computer-readable recording medium that stores a computer program for causing a guide system including a guide server, a mobile-side terminal apparatus, and a standby-side user terminal apparatus being independent of each other and communicating to each other via a network, to execute:

storing, by the mobile-side terminal apparatus, first route information showing a route that a user of the mobile-side terminal apparatus follows;

acquiring a present position of the mobile-side terminal apparatus by the mobile-side terminal apparatus;

displaying, by the mobile-side terminal apparatus, the route shown by the first route information and the present position of the mobile-side terminal apparatus;

transmitting only information showing the present position of the mobile-side terminal apparatus from the mobile-side terminal apparatus to the standby-side user terminal apparatus receiving, from the mobile-side terminal apparatus, the present position of the mobile-side terminal apparatus by the standby-side user terminal apparatus;

transmitting to the standby-side terminal apparatus, by the guide server, only a second route information showing a route related to the present position of the mobile-side terminal apparatus without transmitting, by the guide server, to the standby-side terminal apparatus the information showing the present position of the mobile-side terminal apparatus;

receiving, from the mobile-side terminal apparatus, the information showing the present position of the mobile-side terminal apparatus by the standby-side user terminal apparatus;

receiving, from the guide server, the second route information by the standby-side user terminal apparatus; and displaying the route shown by the second route information and the present position of the mobile-side terminal apparatus, by the standby-side user terminal apparatus.

* * * * *